United States Patent
Toukmaji et al.

(10) Patent No.: US 8,869,163 B2
(45) Date of Patent: Oct. 21, 2014

(54) INTEGRATED ENVIRONMENT FOR EXECUTION MONITORING AND PROFILING OF APPLICATIONS RUNNING ON MULTI-PROCESSOR SYSTEM-ON-CHIP

(75) Inventors: Abdulnour Toukmaji, Irvine, CA (US); Dmytro Lysenko, Krjukivshina (UA); Sumesh Subramanian, Irvine, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 168 days.

(21) Appl. No.: 13/185,748

(22) Filed: Jul. 19, 2011

(65) Prior Publication Data

US 2012/0185864 A1 Jul. 19, 2012

Related U.S. Application Data

(60) Provisional application No. 61/433,855, filed on Jan. 18, 2011.

(51) Int. Cl.
| | |
|---|---|
| G06F 9/46 | (2006.01) |
| G06F 3/048 | (2013.01) |
| G06F 11/36 | (2006.01) |
| G06F 9/48 | (2006.01) |
| G06F 11/34 | (2006.01) |

(52) U.S. Cl.
CPC .......... G06F 9/4881 (2013.01); G06F 11/3636 (2013.01); G06F 11/3466 (2013.01); G06F 2201/865 (2013.01); G06F 11/3628 (2013.01)
USPC ............................ 718/104; 718/103; 715/779

(58) Field of Classification Search
CPC .............. G06F 9/4881; G06F 11/3466; G06F 11/3628; G06F 11/3636; G06F 2201/865
USPC ................... 718/104, 103; 715/779
See application file for complete search history.

(56) References Cited

U.S. PATENT DOCUMENTS

| | | | | |
|---|---|---|---|---|
| 6,434,589 | B1* | 8/2002 | Lin et al. ........................ | 718/100 |
| 6,711,616 | B1* | 3/2004 | Stamm et al. ................. | 709/226 |
| 7,171,652 | B2* | 1/2007 | Motoyama et al. ........... | 717/123 |
| 8,352,621 | B2* | 1/2013 | Di Balsamo et al. ......... | 709/229 |
| 2002/0143915 | A1* | 10/2002 | Mathieson .................... | 709/223 |
| 2010/0318852 | A1 | 12/2010 | Zheng | |

OTHER PUBLICATIONS

Holma et al., "Real-Time Execution Monitoring on Multi-Processor System-on-Chip", IEEE, 2008, pp. 3-6.
Ventroux et al., "A Low Complex Scheduling Algorithm for Multi-Processor System-on-Chip", Parallel and Distributed Computing and Networks 2005, pp. 1-6.
Shobaki et al., "A Hardware and Software Monitor for High-Level System-on-Chip Verification", Quality Electronic Design 2001, pp. 1-6.

\* cited by examiner

*Primary Examiner* — Camquy Truong
(74) *Attorney, Agent, or Firm* — Farjami & Farjami LLP

(57) ABSTRACT

There is provided a system and method for providing an integrated environment for execution monitoring and profiling of applications running on multi-processor system-on-chips. There is provided a method comprising obtaining task execution data of an application, the task execution data including a plurality of task executions assigned to a plurality of hardware resources, showing a scheduler view of the plurality of task executions on a display, receiving a modification request for a selected task execution from the plurality of task executions, reassigning the plurality of task executions to the plurality of hardware resources based on implementing the modification request, and updating the scheduler view on the display. As a result, the high level results of specific low level optimizations may be tested and retried to discover which optimization routes provide the greatest benefits.

16 Claims, 4 Drawing Sheets

REPORT_0

LTE_MULTICHAN_DEMOD

| Id | 163 |
|---|---|
| Key | 0xE8 |
| Address | 0x89BA4A0 |
| Log index | 0 |
| Subframe index | 7 |
| Sublist id | 0 |
| Resource Id | 3(CEVA) |
| Resource index | 4 |
| Resource freq | 500 MHz |
| Resource condition | Unknown |

|  | Ticks | µs | CEVA cycles |
|---|---|---|---|
| Start | 954365 | 6362.433 |  |
| Stop | 972078 | 6480.520 |  |
| Ticks | 17713 | 118.087 | 59043 |
| Realticks | 9040 | 60.267 | 30133 |

Dependency

| Name | Id |
|---|---|
| RX_CHANEST_P2 | 159 |

In current subframe
Number of occurances: 12

|  | Ticks | µs | CEVA cycles |
|---|---|---|---|
| Total | 178842 | 1192.280 | 596140 |
| Average | 14903 | 99.353 | 49676 |
| Max | 17927 | 119.513 | 59756 |
| Min | 10058 | 67.053 | 33526 |

In current log file
Number of occurances: 132

|  | Ticks | µs | CEVA cycles |
|---|---|---|---|
| Total | 1984653 | 13231.020 | 6615510 |
| Average | 15035 | 100.233 | 50116 |
| Max | 19590 | 130.600 | 65300 |
| Min | 10058 | 67.053 | 33526 |

Edit Task

| Global | Depends | Data |

| id | 158 |
| name | RX_CHANEST_P1 |
| key | 000003F4 |
| resid | 3 |
| resindex | 1 |
| index | 3 |
| tickstart | 45027865 |
| ticks | 34047 |
| note | |
| pos | 0,0 |
| priority | 0 |
| level | 0 |
| address | 088B5CC0 |
| logindex | 0 |
| frameindex | 0 |
| listid | 0 |
| trueticks | 32904 |

[ Ok ] [ Cancel ]

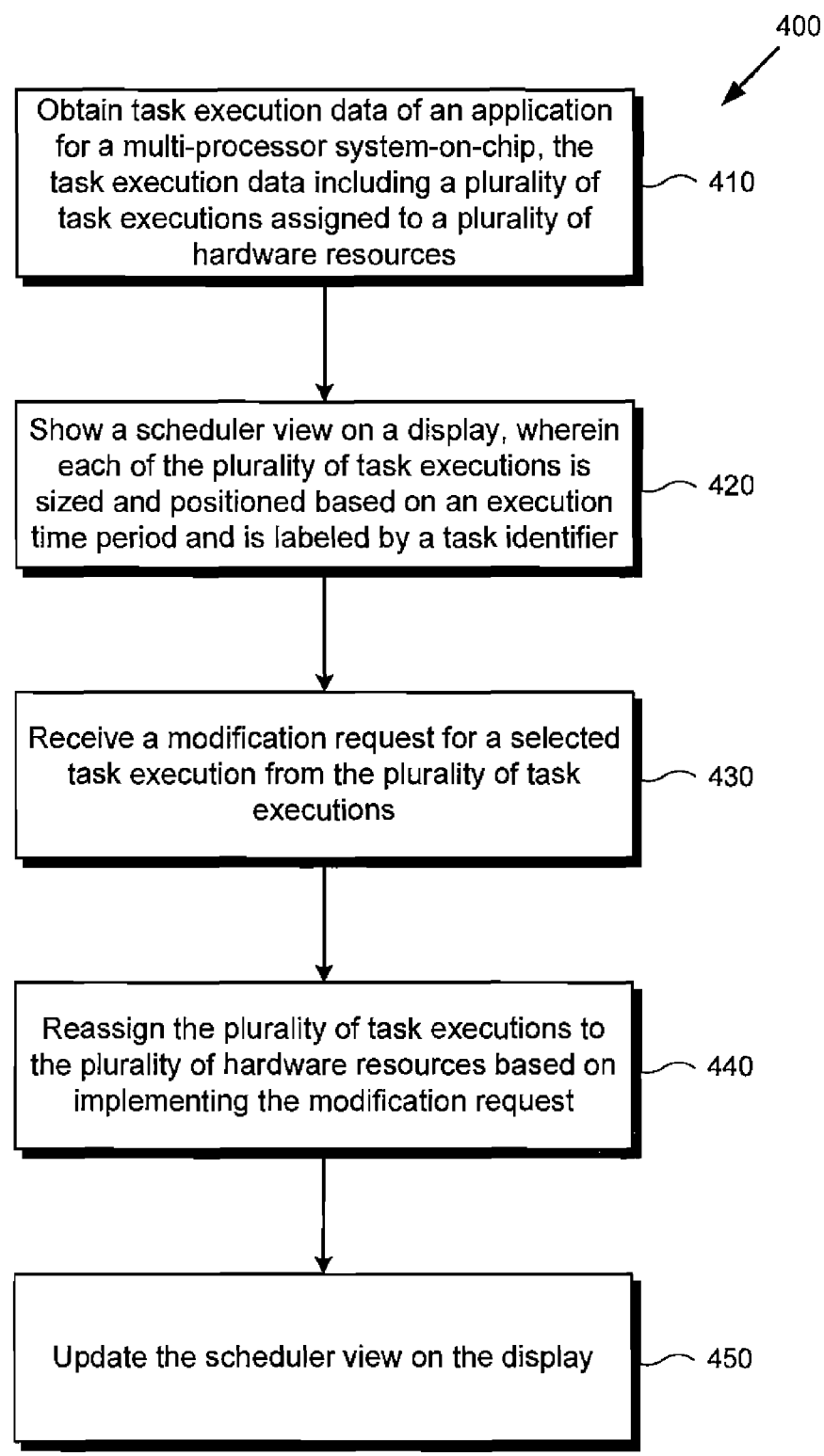

INTEGRATED ENVIRONMENT FOR EXECUTION MONITORING AND PROFILING OF APPLICATIONS RUNNING ON MULTI-PROCESSOR SYSTEM-ON-CHIP

RELATED APPLICATIONS

This application claims priority to U.S. Provisional Application No. 61/433,855, filed on Jan. 18, 2011, which is hereby incorporated by reference in its entirety.

BACKGROUND OF THE INVENTION

1. Field of the Invention

The present invention relates generally to processing systems, and more specifically to multi-core processing systems.

2. Background Art

Multi-processor System on Chips (MPSoC) are often favored for applications requiring high performance while maintaining a particular cost and power consumption budget. Unfortunately, effectively harnessing the power available to MPSoCs often requires very complex programming techniques to fully utilize the wide variety of hardware resources that may be available to the programmer, which may include multi-core processors, custom DSP chips, DMA engines, memory chips, and other components. Moreover, concurrent code execution on separate hardware resources introduces issues of I/O dependencies and task synchronization that are difficult to resolve and optimize without having a deep understanding of the hardware components and their various inter-relations.

More specifically, MPSoC programmers are faced with the non-trivial tasks of 1) task partitioning, or breaking up a large high-level monolithic application into smaller tasks that can be run in parallel, 2) application mapping, or determining where each specific function or task is to be executed, for example to which particular processor of the various types that may be available, 3) task scheduling, or determining when each specific function or task is to be executed, for example, a task can only be executed when an available processor is available and this specific task has no pending data dependencies.

To assist application programmers and designers in task partitioning, application mapping, and task scheduling of high-level application code for MPSoCs, various MPSoC tools and techniques for automated scheduling have been developed. While such automated task scheduling techniques may provide acceptable results without additional edits, manual adjustments through an application profiler or visualizer may still be necessary to provide the best possible performance and to meet application requirements for real-time processing.

However, existing tools available for MPSoC profiling and visualization are often difficult to use, focusing on very low level hardware elements while failing to provide a broad, high level view of all processes occurring within the MPSoC. Accordingly, application designers and programmers often fail to appreciate the impact of their programming decisions on total execution time, which may result in the application failing to meet real-time timing requirements. For example, a base station application processing LTE signals may require incoming frames of data to be processed before a certain deadline to avoid buffer under-runs and other errors. If application designers and programmers fail to optimize the LTE processing application to meet those deadlines, the application may fail to operate as intended.

Accordingly, there is a need to overcome the drawbacks and deficiencies in the art by providing a framework that facilitates a high level understanding of MPSoC application code for facilitated profiling and optimization and at the same time allow for specific and low level profiling of an application running on a designated MPSoC.

SUMMARY OF THE INVENTION

There are provided systems and methods for providing an integrated environment for execution monitoring and profiling of applications running on multi-processor system-on-chips, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2 presents a user interface showing a task viewer of an integrated environment, according to one embodiment of the present invention;

FIG. 3 presents a user interface showing a task editor of an integrated environment, according to one embodiment of the present invention;

FIG. 4 shows a flowchart describing the steps, according to one embodiment of the present invention, by which an integrated environment for execution monitoring and profiling of applications running on multi-processor system-on-chips may be presented.

DETAILED DESCRIPTION OF THE INVENTION

Figure 1:
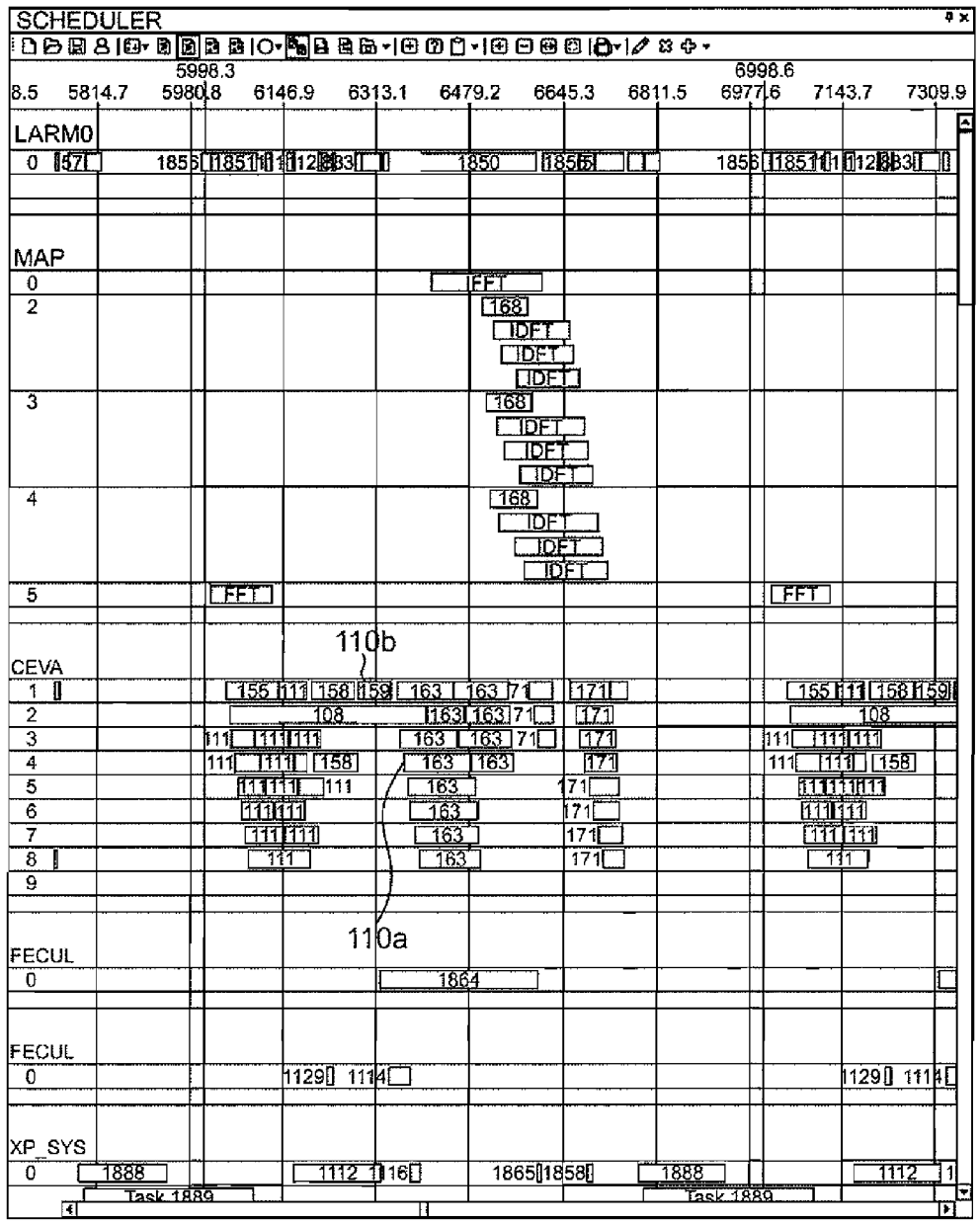
FIG. 1 presents a user interface showing a scheduler view of an integrated environment, according to one embodiment of the present invention.

The present application is directed to a system and method for providing an integrated environment for execution monitoring and profiling of applications running on multi-processor system-on-chips. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Embodiments of the present invention provide an integrated environment for execution monitoring and profiling of applications running on MPSoCs. One exemplary MPSoC implementation is described in "MULTI-CORE SYSTEM WITH CENTRAL TRANSACTION CONTROL", U.S. patent application Ser. No. 12/313,561 filed Nov. 20, 2008, which is hereby incorporated by reference in its entirety.

The integrated environment may be utilized for real-time profiling or after-execution profiling and may provide optional debugging capabilities. Some exemplary tools for providing the profiling data for analysis include the adaptive task scheduler described in "HIGHLY DISTRIBUTED PARALLEL PROCESSING ON MULTI-CORE DEVICE", U.S. patent application Ser. No. 12/657,406 filed Jan. 19, 2010, and some exemplary MPSoC optimization techniques are described in "TASK LIST GENERATION, PARALLELISM TEMPLATES, AND MEMORY MANAGEMENT FOR MULTI-CORE SYSTEMS", U.S. patent application Ser. No. 12/655,786 filed Jan. 6, 2010, which are hereby incorporated by reference in their entirety. However, as previously discussed, automated scheduler optimization techniques may be insufficient to meet application task deadlines, and manual optimization may be necessary to bring application performance to a satisfactory level.

Furthermore, by using stub tasks with simulated parameters instead of actual implementation code, the integrated environment may allow the quick visualization of different approaches to task partitioning and mapping for facilitated optimization during the design phase of an application. By using a graphical user interface presented by the integrated environment, a user may easily change and arrange tasks as desired, allowing for rapid prototyping and providing a clear and comprehensive view into the various decisions that impact total required execution time on the MPSoC.

FIG. 1 presents a user interface showing a scheduler view of an integrated environment, according to one embodiment of the present invention. As shown by diagram 100 of FIG. 1, various MPSoC resources are listed vertically in the scheduler, including LARM0 (Lower ARM processor 0), MAP (Mindspeed Accelerator Processor), CEVA DSP Engines, FECDL (Forward Error Correction Uplink), FECDL (Forward Error Correction Downlink), XP_SYS DMA Engine, and additional components not visible in FIG. 1 but accessible by using the vertical scroll bar to the right. The horizontal axis represents time in diagram 100 of FIG. 1, which may be indicated using microseconds or another suitable time format. The task execution data for populating diagram 100 may be obtained from an after-execution log file or alternatively streamed and updated continuously in real-time from an MPSoC scheduler executing an application. The user interface of diagram 100 may be shown on a display, such as a liquid crystal display.

As shown in diagram 100 of FIG. 1, each MPSoC hardware resource shows the execution time of assigned tasks by horizontal boxes indicating tasks, with longer boxes indicating longer execution times. Diagram 100 of FIG. 1 includes task box 110a and 110b. If space permits, the full name of the task may be indicated within a box; otherwise, only the task ID may be indicated inside or adjacent to a box. As shown in diagram 100, some tasks may be given user-friendly labels, such as "FFT" or "IDFT", instead of simply a task number. The user may zoom in and out as necessary to obtain a detailed or an overall view of the task execution flow. For example, it can be seen that many tasks are run in rapid succession on the LARM0 resource, so a user may choose to zoom the horizontal or time axis to obtain a better view of the tasks assigned to LARM0. The user may also use the horizontal scroll bar at the bottom of the interface to view a specific range of time. In addition, this view shows the start time of a task relative to the other tasks in the application, which in turn can expose execution bottlenecks in the application.

If the integrated environment is configured for real-time profiling of an application, task boxes may be added dynamically as execution progresses, continuing horizontally to the right until execution is terminated. The integrated environment may execute on a processor of the host device or on a processor of a remote device as required. If the integrated environment is configured for after-execution or post-mortem profiling of an application, then the task boxes will reflect the prior tasks that were executed, and no additional task boxes are added unless manually added by the user. In this case, only a task log file after the execution of the application is required. Alternatively, if the application is not yet developed, the integrated environment may be configured using stub tasks with user-defined parameters, allowing the user to rapidly prototype an MPSoC application in the design phase without actually writing the low-level code.

Thus, the user is enabled to easily rearrange and modify the task boxes shown in diagram 100 of FIG. 1, for example by clicking and dragging to move tasks, by resizing task boxes to edit their execution time, or by editing individual task properties (see discussion of FIG. 3 below). After making a modification, the integrated environment may reevaluate task dependencies and any other MPSoC considerations to recalculate and reassign the scheduling of tasks, if necessary.

For example, the user may decide to experiment by reducing the execution time of task 159, indicated by task box 110b, into half the indicated time, anticipating that potential optimizations may halve the execution time of task 159. The integrated environment may then recalculate the tasks shown in diagram 100 of FIG. 1, shifting task 163 on "CEVA 1" towards the left or towards an earlier execution start time. If this shifting of task 163 on "CEVA 1" affects the start/end/total execution times of other tasks in the MPSoC, they will also be calculated and reflected in the user interface shown in diagram 100 of FIG. 1. Based on the end results reflected by the changes shown in the user interface, the user may then make a decision whether optimizing task 159, or task box 110b, is worth pursuing. By experimenting in the above manner, the user can easily try different optimization strategies and discover which optimization routes provide the greatest benefits. Additionally, the user can experiment with sub-task profiling, whereby the profiling environment can present the user with timings data reflecting the execution of certain sections of the function or task being investigated to further tune the optimization effort.

In another example, the user may decide to reserve particular resources for particular tasks to meet certain real-time deadline requirements. For example, the user may reserve "CEVA 9" for running only one particular task or subset of tasks that must be completed in the shortest time possible. As the result, the task scheduler may be prevented from assigning any other tasks to "CEVA 9" that may potentially block the time sensitive tasks, thus allowing the user to tailor the usage of particular hardware resources as the specific real-time application demands. The user may also manually move tasks from one hardware resource to another, which may result in greater optimization benefits compared to an automated assignment by a compiler or a scheduler.

To obtain more detailed information about a specific task shown in diagram 100 of FIG. 1, the user may click on a specific task box. For example, the user may decide to click on task box 110a, corresponding to task ID 163 executing on "CEVA 4". Thus, moving to FIG. 2, FIG. 2 illustrates a user interface showing a task information view of an integrated environment utilizing an embodiment of the present invention. After the user clicks on task box 110a in FIG. 1, an information dialog similar to that shown in diagram 200 of FIG. 2 may be presented to the user on a display, for example to the side of the interface shown in diagram 100 of FIG. 1, or as a floating or separate window. As shown in diagram 200 of FIG. 2, the selected task Id 163 is identified as "LTE_MUL- TICHAN_DEMOD", and all data relevant to that particular task Id is shown, including start/end/total execution time, task dependencies, and other data.

Additionally, besides the individually selected task, statistical data for all instances of the task may be shown. For example, the average execution time of all 12 instances (occurrences) in the current subframe and all 132 instances in the current log file are indicated by diagram 200 of FIG. 2. These statistics may assist the user in determining specific tasks that have a high average execution time compared to a minimum execution time, which may indicate candidates for subroutine optimization. In addition, the summary totals may give the user a broad perspective of the resource usage for the selected task, helping to focus optimization effort where it may be most needed.

Moving to FIG. 3, FIG. 3 illustrates a user interface showing a task editing view of an integrated environment utilizing an embodiment of the present invention. The user interface of diagram 300 may be shown on a display, such as a liquid crystal display. As discussed above, the integrated environment allows the user to modify specific tasks to gauge the effect on total execution time. As shown in diagram 300 of FIG. 3, a task with the id 158 and name "RX_CHANEST_P1" is selected for editing. Fields in grayed boxes may not be editable by the user; however, white boxes may be available for the user to edit. Thus, for example, the user might modify the "ticks" parameter indicating the execution time of the task. Moreover, as shown by the tabs at the top of diagram 300 of FIG. 3, the user may switch to the "Depends" tab to add, edit, or remove task or data dependencies and the "Data" tab to examine input/output buffers of the task if the proper debugging build of the application has been compiled and executed. In particular, the I/O buffers of the "Data" tab may be compared against well-known results or expected results for that particular task to assist in debugging of the application and to verify correct execution of the task.

Moving to FIG. 4, FIG. 4 shows a flowchart describing the steps, according to one embodiment of the present invention, by which an integrated environment for execution monitoring and profiling of applications running on multi-processor system-on-chips may be provided. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4, step 410 of flowchart 400 comprises obtaining task execution data of an application for a multi-processor system-on-chip, the task execution data including a plurality of task executions assigned to a plurality of hardware resources. As previously discussed, the task execution data may be obtained postmortem from a log file after the application is executed, or streamed in real-time from the application.

Referring to step 420 of flowchart 400 in FIG. 4 and diagram 100 of FIG. 1, step 420 of flowchart 400 comprises showing a scheduler view on a display, wherein each of the plurality of task executions is sized and positioned based on an execution time period and is labeled by a task identifier. As shown in diagram 100, the plurality of task executions is organized along the Y axis indicating the plurality of hardware resources, and along the X axis indicating the progression of time. Each task execution is sized and positioned according to its execution time period, and is labeled within or nearby with a task identifier, which may comprise a numeric task identifier or a user-friendly name such as "FFT".

Referring to step 430 of flowchart 400 in FIG. 4 and diagram 100 of FIG. 1, step 430 of flowchart 400 comprises receiving a modification request for a selected task execution from the plurality of task executions shown in diagram 100. For example, in one embodiment, the user may select task box 110*a* using a pointing device. The user may then click on an "edit" button to bring up a task editor view as seen in diagram 300 of FIG. 3, where the user may provide user input by modifying the listed data fields. Additionally, as previously described, the user may add, edit, or remove task or data dependencies using the "Depends" tab. In another embodiment, the user may provide a user interface action of clicking and dragging the borders of task box 110*a* to resize task box 110*a* and therefore adjust the execution time window of the selected task execution. In yet another embodiment, the user may provide a user interface action of clicking and dragging task box 110*a* to another time offset or another hardware resource, such as a different CEVA core. Thus, the user is enabled to provide a modification request to adjust the execution time period, to manually assign a hardware resource, to modify a task dependency, or to otherwise request a modification of the selected task execution.

Referring to step 440 of flowchart 400 in FIG. 4 and diagram 100 of FIG. 1, step 440 of flowchart 400 comprises reassigning the plurality of task executions to the plurality of hardware resources based on implementing the request of step 430. Thus, for example, the request of step 430 may comprise reducing the execution time of task 163, indicated by task box 110*a*, into half the indicated time, anticipating that potential optimizations may halve the execution time of task 163. The integrated environment may then recalculate and reassign the tasks shown in diagram 100 of FIG. 1, halving the size of task boxes corresponding to task 163 on each of the CEVA core hardware resources. This may, in turn, allow other tasks, such as task 171, to begin executing sooner. However, data dependencies within the plurality of tasks might result in task 171 still waiting for data from other tasks, thus resulting in no optimization improvement for the CEVA cores within a data processing frame.

Referring to step 450 of flowchart 400 in FIG. 4 and diagram 100 of FIG. 1, step 450 of flowchart 400 comprises the scheduler view, or diagram 100, on the display. Thus, the reassignment determined in step 440 is reflected on the display, allowing the user to observe the results of the requested modification in a broad, high-level manner. As a result, the results of specific optimizations may be tested and retried to discover which optimization routes provide the greatest benefits.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for providing an integrated environment for execution monitoring and profiling of applications running on multi-processor system-on-chips, the method comprising:

obtaining task execution data of an application for a multi-processor system-on-chip, the task execution data including a plurality of task executions assigned to a plurality of hardware resources;

showing a scheduler view on a display, wherein each of the plurality of task executions is sized and positioned based on an execution time period and is labeled by a task identifier;

receiving through a user interface a modification request for a selected task execution from the plurality of task executions;

reassigning the plurality of task executions to the plurality of hardware resources based on implementing the modification request; and updating the scheduler view on the display;

wherein the application comprises a debugging build wherein a task editing view shows input/output (I/O) buffers of the selected task execution, and wherein the modification request is by receiving a user interface action adjusting a size of the selected task execution in the scheduler view.

2. The method of claim 1, wherein the modification request comprises adjusting the execution time period of the selected task execution.

3. The method of claim 1, wherein the modification request comprises manual assignment of the selected task execution to a selected hardware resource of the plurality of hardware resources.

4. The method of claim 1, wherein the modification request comprises modifying a task dependency of the selected task execution.

5. The method of claim 1, wherein the modification request is by receiving a second user interface action moving the selected task execution in the scheduler view.

6. The method of claim 1, wherein the modification request is by receiving a second user input from the task editing view of the selected task execution.

7. The method of claim 1, wherein the plurality of task executions are continuously updated in real-time from the application.

8. The method of claim 1, wherein the selected task execution comprises a stub task.

9. A device providing an integrated environment for execution monitoring and profiling of applications running on multi-processor system-on-chips, the device comprising a processor configured to:

obtain task execution data of an application for a multi-processor system-on-chip, the task execution data including a plurality of task executions assigned to a plurality of hardware resources;

show a scheduler view on a display, wherein each of the plurality of task executions is sized and positioned based on an execution time period and is labeled by a task identifier;

receive through a user interface a modification request for a selected task execution from the plurality of task executions;

reassign the plurality of task executions to the plurality of hardware resources based on implementing the modification request; and update the scheduler view on the display;

wherein the application comprises a debugging build, wherein a task editing view shows input/output (I/O) buffers of the selected task execution, and wherein the modification request is by receiving a user interface action adjusting a size of the selected task execution in the scheduler view.

10. The device of claim 9, wherein the modification request comprises adjusting the execution time period of the selected task execution.

11. The device of claim 9, wherein the modification request comprises manual assignment of the selected task execution to a selected hardware resource of the plurality of hardware resources.

12. The device of claim 9, wherein the modification request comprises modifying a task dependency of the selected task execution.

13. The device of claim 9, wherein the modification request is by receiving a second user interface action moving the selected task execution in the scheduler view.

14. The device of claim 9, wherein the modification request is by receiving a second user input from the task editing view of the selected task execution.

15. The device of claim 9, wherein the plurality of task executions are continuously updated in real-time from the application.

16. The device of claim 9, wherein the selected task execution comprises a stub task.

* * * * *